United States Patent Office

3,850,856
Patented Nov. 26, 1974

1

3,850,856
HYDROXYL-ENDED EPIHALOHYDRIN POLYMERS BY CATIONIC POLYMERIZATION
Max Peter Dreyfuss, Akron, Ohio, assignor to The B. F. Goodrich Company, New York, N.Y.
No Drawing. Filed Aug. 20, 1973, Ser. No. 390,029
Int. Cl. C08g 23/14
U.S. Cl. 260—2 A
14 Claims

ABSTRACT OF THE DISCLOSURE

There is disclosed a process for the polymerization of epihalohydrin wherein the catalyst (initiator) employed is a trialkyl oxonium salt of an $HMF_6$ acid wherein M is a Group V element selected from the group consisting of phosphorus, arsenic and antimony, and wherein said polymerization is conducted in the presence of controlled amounts of water or ethylene glycol. The significant feature of the present invention is that with the catalysts and water or glycol, under the polymerization conditions employed, hydroxyl-ended low molecular weight polymers having many useful applications are produced easily and readily. Importantly, the yield of polymer per unit weight of catalyst employed is greatly increased.

BACKGROUND OF THE INVENTION

Hydroxyl-terminated liquid olefinic polymers are useful as crosslinking agents with difunctional polymers, as adhesives, and as caulking and potting compounds. They cure readily through reaction of the terminal hydroxyl groups with organic diisocyanates to form solid high molecular weight materials of low fusibility.

High molecular weight polymers, prepared by the polymerization of epihalohydrins, for example, epichlorohydrin, are well known. However, such polymers contain at best no more than one active hydrogen end group per molecule. Accordingly, the amount of active hydrogen concentration in the polymer is so low as to be essentially ineffective as a means of modifying the polymer and in many cases, cannot be detected. Any means by which the active hydrogen content of the polymer molecule can be increased greatly enhances the utility of the polymer.

Low molecular weight, essentially linear, polymers with reactive terminal groups are unique materials. Because of their low molecular weight, they have a very low viscosity above their softening or melting points which results in easy mixing with chain-existing agents, fillers, antioxidants, light stabilizers, etc. and also results in easy fabrication, even of complex parts. The reactive end-groups make it possible to build the molecular weight up during or after fabrication by reaction with di- or polyfunctional agents to give excellent physical properties in the final products.

Low molecular weight liquid hydroxyl-ended epihalohydrin polymers, and particularly, polyepichlorohydrin, have been produced heretofore. However, prior art polymers of this type have been limited in their utility due to their high brittle point. Usually these polymers are prepared by first producing a high molecular weight polyepihalohydrin and then cleaving the polymer molecule. Cleaving is accomplished by converting a portion of the olefinic bonds of the polymer to ozonide linkages, and then reductively cleaving the ozonide linkages to produce hydroxyl-terminated polymer.

2

Alternative processes for producing low molecular weight hydroxyl-ended epihalohydrin polymers are desirable and constantly being sought after. Also, polymers prepared by cleavage of higher molecular weight chains generally do not achieve complete hydroxyl functionality at each end of the polymer chains, that is, the final hydroxyl functionality is generally considerably less than 2. For most efficient results and the best overall properties it is desirable to have the final hydroxyl functionality as close to 2.0. as possible. The present invention, as described in detail hereinafter, achieves these desired results.

SUMMARY OF THE INVENTION

It has unexpectedly been found that excellent hydroxyl-ended polymers of epihalohydrins, and in particular, epichlorohydrin, can be produced by the cationic polymerization thereof in the presence of water or ethylene glycol in controlled amounts and employing as a polymerization catalyst or initiator, a trialkyl oxonium salt of an $HMF_6$ acid, wherein M is a Group V element selected from the group consisting of phosphorus, arsenic and antimony. Specifically, exceptionally good results were obtained when epichlorohydrin was polymerized in the presence of water using triethyloxonium hexafluorophosphate (TEOP) as the cationic catalyst or initiator. The resultant polymer showed the presence of hydroxyl functions since the hydroxyl number was readily measurable.

DETAILED DESCRIPTION

The present invention is concerned with producing hydroxyl-ended or hydroxyl-terminated polymers of low molecular weight, or of a molecular weight which results in a rubbery polymeric material suitable for use as such, or which, due to its functional groups, is capable of being further reacted with di- or polyfunctional compounds to increase the molecular weight. The invention is particularly applicable to producing polymers of epihalohydrins or halo-substituted alkylene oxides, such as, epichlorohydrin, epibromohydrin, etc. By far, the most important of these monomers is epichlorohydrin due to its excellent commercial acceptance and widespread use.

It has been found that in order to produce the desired hydroxyl ended polymers of the instant invention, the choice of the cationic polymerization catalyst or initiator is important, since not all cationic polymerization catalysts will produce the desired end result using the instant inventive process. The best results are obtained when the cationic catalyst employed is a trialkyl oxonium salt of an $HMF_6$ acid wherein M is a Group V element selected from the group consisting of phosphorus, arsenic and antimony, such acids being $HPF_6$, $HAsF_6$ and $HSbF_6$. These catalysts can be prepared in a number of ways but the most convenient and economical method is that described in my patent, U.S. Pat. No. 3,585,227. This process entails mixing a solution of an $HMF_6$ acid with an epoxide selected from the class consisting of the alkylene oxides and the halogen-substituted alkylene oxides and a dialkyl ether at low temperatures. The ether employed in said process determines the alkyl groups present in the oxonium salt and one will select the ether for this purpose. There may be employed any of the dialkyl ethers including such ethers where the alkyl groups are alike and those where they are dissimilar including, for example, dimethyl ether, methyl ethyl ether, diethyl ether, dipropyl ether, ethyl propyl ether, di-n-butyl ether, di-n-amyl ether, dihexyl ether, di-2-ethylhexyl ether, etc. The use of dialkyl ethers with dissimilar alkyl groups will produce an oxonium salt in which the alkyl groups also are dissimilar. Most important, for the purposes of this invention, the oxonium salts so obtained are stable toward water, which is most surprising, since prior literature had indicated such oxonium salts to be unstable toward water.

The preferred catalyst for use in the present process is triethyloxonium hexafluorophosphate (TEOP)

$$((C_2H_5)_3O^+PF_6^-),$$

which is an easily handled, stable crystalline salt, although the other catalysts described above work equally as well. The amount of catalyst or initiator employed will vary but in general, an amount equal to about 0.001 part by weight to about 0.10 part by weight, based on 100 parts by weight of monomer being polymerized, is satisfactory. Since it is usually desirable, for economic reasons, to maintain the catalyst level as low as possible, an amount of catalyst in the range of 0.004 part to 0.025 part by weight, based on 100 parts by weight of monomer, is preferred. The specific amount of catalyst used in any particular polymerization will depend upon the particular $HMF_6$ salt being used, the mode of polymerization, temperature of reaction, and the like.

The amount of water or glycol employed in the process of the present invention is critical since the use of too much water or glycol terminates the polymerization completely rather than functioning as a transfer agent. When the proper amount of water or glycol is employed, it acts as a transfer agent in the cationic polymerization reaction resulting in, ideally, the introduction of a hydroxyl group at the end of a polymer chain stopped and the introduction of a hydroxyl group at the beginning of a new polymer chain. This would result in two hydroxyl groups per polymer chain. However, I have found that the introduction of an average of 1.7 hydroxyl groups per polymer chain gives very useful polymers. By means of the present invention one is able to introduce into the polymer chain from about 1.6 to 2.0 hydroxyl groups per polymer chain in approximately 75% to 95% of the polymer chains, on the average.

While the water or glycol level employed is critical, the amount thereof can be varied within certain prescribed limits. Due to the difference in molecular weight, the amounts of water and glycol will vary. Usually, an amount of water in the range of about 0.03 part to about 5.0 parts and an amount of glycol in the range of about 0.05 part to about 15.0 parts, said parts being by weight, based on the weight of 100 parts of the monomer being polymerized, gives the desired results. That is to say, an amount of water or ethylene glycol in the range of about 0.03 part to about 15.0 parts by weight is sufficient. However, the best results, i.e., producing a polymer having the highest average number of hydroxyl groups per polymer chain and the desired molecular weight, are achieved when the amount of water used is in the preferred range of 0.16 part to 1.5 parts by weight, based on the weight of 100 parts of monomer being polymerized, and the amount of glycol is in the preferred range of 0.16 part to 8.0 parts by weight, based on the weight of 100 parts of monomer being polymerized.

In general, in carrying out the process of the present invention, a mass or bulk polymerization technique is employed. That is, no solvent or inert diluent is used and the catalyst is added to the monomer containing the necessary quantity of water or glycol. The catalyst may be added all at once but preferably, the catalyst is added incrementally or continuously during the reaction period in order to better control the temperature and rate of reaction. However, it is possible to carry out the polymerization reaction in the presence of from about one part to 50 parts by weight, based on the weight of 100 parts of the monomer being polymerized, of a suitable inert organic solvent or diluent. The use of a solvent provides for more efficient mixing of the reaction materials, reduces viscosity, provides ease in maintaining exothermic control of the reaction mixture and facilitates control of monomeric concentration during polymerization. Suitable inert solvents for use in this invention are the liquid hydrocarbons, such as benzene, toluene, propane, butanes, pentanes, hexane, heptane, cyclohexane, and the like, chlorinated hydrocarbons such as chlorobenzene, carbon tetrachloride, and the like.

The temperature used in the polymerization reaction is between about 0° C. and 110° C. However, it is preferred to employ temperatures in the range of about 40° C. to about 80° C. since, at these temperatures polymers having the most desirable properties are produced. It may be desirable, in many cases, to preheat or precool the contents of the reactor to the desired reaction temperature prior to the addition of catalyst or initiator. The polymerization reaction is exothermic and thus the reaction temperature is readily maintained by the controlled rate of catalyst addition. The time of the reaction will vary from about one to 10 hours.

The polymers formed by the above-described method will be of low molecular weight and will vary from fluid liquids to thick semisolids. The number average molecular weight ($M_n$) of such polymers will vary from about 800 to 8000. The molecular weight is normally specified in terms of "Reduced Solution Viscosity" or "RSV" which is a point value viscosity determined as the viscosity at 25° C. of a solution of 0.4 gram of polymer dissolved in 100 ml. of dimethyl formamide containing 3% by volume of acetylacetone (expressed as deciliter per gram or dl./g.). The range of RSV corresponding to the number average molecular weight range given above will be from about 0.025 to about 0.450.

The polymerization reaction may be carried out at autogenous pressure although superatmospheric pressures of up to 10 atmospheres or more may be employed with some advantage with the more volatile monomers. Superatmospheric pressures may also be employed with those monomers and/or solvents having the requisite volatilities at reaction temperatures permitting reflux cooling of the reaction mixture.

One of the unexpected results of the instant invention is the high yield of polymer obtainable. That is, the weight of polymer produced per unit weight of catalyst or initiator employed. For example, a yield of 1000 grams of polymer to about 25,000 grams of polymer per one gram of catalyst used is obtained by use of the present invention.

To further illustrate the present invention, the following specific examples are given, it being understood that this is merely intended in an illustrative and not a limitative sense. In the examples all parts and percents are by weight unless otherwise indicated.

Example I

In this example a series of runs were made in which, in each case, epichlorohydrin was polymerized using a bulk polymerization technique in the presence of varying amounts of water. In each run 250 ml. (295–296 grams) of epichlorohydrin was polymerized in a closed reaction vessel, with stirring or agitation, using as the catalyst, triethyloxonium hexafluorophosphate (TEOP) in varying amounts. After recovering the resultant hydroxyl-ended epichlorohydrin polymer in the usual manner, various tests were run on each sample. Amounts of materials, reaction conditions and the resulting test data are given in the following table in which "PZN" means polymerization.

TABLE I

| Run No. | PZN time in hours | PZN temp. in °C. | Amount water in ml. | Amount TEOP in gms. | Yield, gms. polymer per gm. TEOP | Percent conversion | Hydroxyl, number found [1] | Hydroxyl, number calculated [2] | RSV |
|---|---|---|---|---|---|---|---|---|---|
| 1 | 3 | 50-58 | [3] 1.0 | 0.07 | 2,200 | 53 | 43 | 40 | 0.043 |
| 2 | 3 | 55 | [3] 1.0 | 0.08 | 3,200 | 87 | 28 | 24 | 0.050 |
| 3 | 3 | 55 | 2.0 | 0.125 | 2,250 | 95 | 45 | 44 | 0.038 |
| 4 | 3 | 50 | 0.067 | 0.035 | 2,230 | 18 | 74 | 80 | 0.037 |
| 5 | 3 | 50 | 0.83 | 0.035 | 1,900 | 15 | 88 | 116 | 0.032 |
| 6 | 3 | 50 | 1.07 | 0.035 | 1,710 | 13 | 130 | 173 | 0.028 |
| 7 | 3.5 | 50 | [3] 3.0 | 0.175 | 1,315 | 78 | 84 | 81 | 0.039 |

[1] Method employed was that reported by Hase and Hase in Analyst 97, 998 (1972).
[2] Calculations were made on assumption that (a) 2 hydroxyls result from each water molecule and that (b) all water charged ended up in the product isolated.
[3] Water added incrementally during reaction.

As can be seen from the above Table I, all of the polymers produced had a molecular weight well within the desired range, as defined herein, and all contained the desired number of hydroxyl groups.

Example II

In this example the procedure of Example I was followed except that ethylene glycol was employed in place of water. A series of runs were made and the amounts of materials, reaction conditions and the resulting test data are given in the following table in which "PZN" means polymerization.

TABLE II

| Run No. | PZN time in hours | PZN temp. in °C. | Amount glycol in ml. | Amount TEOP in gms. | Yield, gms. polymer per gm. TEOP | Percent conversion | Hydroxyl, number found [1] | Hydroxyl, number calculated [2] | RSV |
|---|---|---|---|---|---|---|---|---|---|
| 8 | 2 | 55 | 1.0 | 0.05 | 4,100 | 70 | 15 | 10 | 0.088 |
| 9 | 2 | 50-55 | 3.0 | 0.073 | 3,200 | 79 | 28 | 25 | 0.050 |
| 10 | 2.5 | 50-55 | 6.0 | 0.103 | 2,560 | 89 | 46 | 45 | 0.040 |
| 11 | 4 | 50-55 | 14.0 | 0.163 | 1,910 | 100 | 88 | 92 | 0.032 |

[1] Method employed was that reported by Hase and Hase in Analyst 97, 998 (1972).
[2] Calculations were made on assumption that (a) 2 hydroxyls result from each water molecule and that (b) all water charged ended up in the product isolated.

Again, as in Example I, all the polymers had the desired molecular weight and number of hydroxyl groups. It should be noted that due to difference in molecular weight, it requires more ethylene glycol than water to obtain the desired results.

The hydroxyl-ended epihalohydrin polymers of the instant invention are easy to prepare and are useful as adhesives and caulking compounds. Further, the polymers of this invention are useful in chain extension reactions.

When the instant polymers are used in chain extension reactions, the chain-extending agent can be any polyfunctional compound which will react, under appropriate conditions of temperature and pressure and in the presence of the proper catalyst, with hydroxyl groups. Such compounds can be di- or polyisocyanates such as m- or p-phenylene diisocyanate, 2,4-toluene diisocyanate, etc., or polyepoxides such as Epon resins, as for example, the diglycidyl ether of Bisphenol A, and the like. The difunctional chain-extending agents are generally used in stoichiometric amounts to the active chain ends, such as hydroxyl groups, when a linear, soluble high polymer product is desired. When the chain-extending agent contains more than two functional groups, the product is generally a cross-linked product. Also, a cross-linked network can be obtained by using a combination of a difunctional active chain end polymer with low molecular weight similar polyreactive compounds. Thus, the polymers of this invention, when combined with a polyol, such as glycerin, and the like, in combination with a diisocyanate will yield a cross-linked polyurethane network.

Cross-linked or chain-extended proudcts prepared by the use of the hydroxyl-ended polymers of the present invention can include other materials compounded therewith such as fillers, including silicas, aluminas, clays, and the like; as well as antioxidants, stabilizers, plasticizers, acid acceptors, and the like.

The hydroxyl-ended polymers of this invention may also be converted to useful polyester and polyamide block copolymers by the usual polyester and polyamide forming reactions, using either a simple monomeric unit or using preformed polyesters or polyamides having appropriate reactive chain ends. In addition, the polymers of this invention are useful in the preparation of polyurethane foams, which may be prepared as rigid, semirigid, or elastomeric foams.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A process for the manufacture of a hydroxyl-ended polymer which comprises polymerizing an epihalohydrin in the presence of from about 0.03 part to 15.0 parts by weight of water or ethylene glycol, based on 100 parts by weight of the epihalohydrin, and with the use of catalytic amounts of a trialkyl oxonium salt of an $HMF_6$ acid wherein M is an element selected from the group consisting of phosphorus, arsenic and antimony.

2. A process as defined in Claim 1 wherein the epihalohydrin is epichlorohydrin.

3. A process as defined in Claim 1 wherein the $HMF_6$ acid is $HPF_6$.

4. A process as defined in Claim 1 wherein said polymerization is conducted in the presence of from about one part to 50 parts by weight, based on the weight of 100 parts of epihalohydrin, of a liquid hydrocarbon.

5. A process as defined in Claim 1 wherein said polymerization is carried out at a temperature in the range of 0° C. to 110° C.

6. A process as defined in Claim 1 wherein the $HMF_6$ acid is $HAsF_6$.

7. A process as defined in Claim 1 wherein the $HMF_6$ acid is $HSbF_6$.

8. A process as defined in Claim 1 wherein the epihalohydrin is polymerized in the presence of from about 0.03 part to 5.0 parts by weight of water, based on 100 parts by weight of the epihalohydrin.

9. A process as defined in Claim 1 wherein the epihalohydrin is polymerized in the presence of from about 0.05 part to 15.0 parts by weight of ethylene glycol, based on 100 parts by weight of the epihalohydrin.

10. A process as defined in Claim 2 wherein the $HMF_6$ acid is $HPF_6$ and the polymerization is carried out at a temperature in the range of 0° C. to 110° C.

11. A process as defined in Claim 10 wherein the trialkyl oxonium salt of $HPF_6$ is added incrementally to the polymerization during the course thereof.

12. A process as defined in Claim 2 wherein the trialkyl oxonium salt of an $HMF_6$ acid is triethyloxonium hexafluorophosphate.

13. A process as defined in Claim 11 wherein the trialkyl oxonium salt of $HPF_6$ is triethyloxonium hexafluorophosphate.

14. A process as defined in Claim 9 wherein the trialkyl oxonium salt of $HPF_6$ is triethyloxonium hexafluorophosphate.

References Cited
UNITED STATES PATENTS

| | | | |
|---|---|---|---|
| 2,856,370 | 10/1958 | Muetterties | 260—2 |
| 3,305,565 | 2/1967 | Mueller | 260—348.6 |
| 3,379,655 | 4/1968 | May et al. | 260—2 |
| 3,442,867 | 5/1969 | May et al. | 260—67 |
| 3,503,898 | 3/1970 | Harris | 252—429 |
| 3,542,828 | 11/1970 | Harris | 260—446 |

MELVIN GOLDSTEIN, Primary Examiner

E. A. NIELSEN, Assistant Examiner

U.S. Cl. X.R.

252—429, 431 R, 431 P; 260—440, 446, 610 R, 615 B